United States Patent
Landry et al.

(10) Patent No.: US 7,333,003 B1
(45) Date of Patent: Feb. 19, 2008

(54) POWER LINE COUPLER ADAPTED FOR USE WITH MULTIPLE ELECTRIC POWER METERS

(75) Inventors: James F. Landry, Germantown, MD (US); Andrew Pozsgay, Germantown, MD (US)

(73) Assignee: Telkonet, Inc., Germantown, MD (US)

( * ) Notice: Subject to any disclaimer, the term of this patent is extended or adjusted under 35 U.S.C. 154(b) by 0 days.

(21) Appl. No.: 11/739,474

(22) Filed: Apr. 24, 2007

(51) Int. Cl.
*H04M 11/04* (2006.01)

(52) U.S. Cl. .......................... 340/310.01; 340/310.05; 340/870.02; 361/118

(58) Field of Classification Search ........... 340/310.01, 340/310.05, 310.06, 870.02; 455/3.3; 375/259
See application file for complete search history.

(56) References Cited

U.S. PATENT DOCUMENTS

| | | | |
|---|---|---|---|
| 6,040,759 A * | 3/2000 | Sanderson | 725/130 |
| 6,975,212 B2 | 12/2005 | Crenshaw et al. | |
| 7,054,770 B2 | 5/2006 | Swarztrauber et al. | |
| 7,176,786 B2 | 2/2007 | Kline et al. | |
| 7,245,472 B2 * | 7/2007 | Davidow | 361/118 |
| 2006/0222086 A1 * | 10/2006 | Frye | 375/257 |

* cited by examiner

*Primary Examiner*—Timothy Edwards, Jr.
(74) *Attorney, Agent, or Firm*—The Nath Law Group; Gary M. Nath; Burman Y. Mathis, III

(57) ABSTRACT

Devices and system for interfacing a power line communications (PLC)-enabled communication device in a building using three-phase power and two separate electric power meters are disclosed. In various embodiments, the system can include a specially-configured coupler that enables PLC communications signals to pass to all power lines but without interfering with the operation of the electric power meters.

20 Claims, 3 Drawing Sheets

POWER LINE COUPLER ADAPTED FOR USE WITH MULTIPLE ELECTRIC POWER METERS

BACKGROUND

1. Technical Field

The present invention relates to power line communications (PLC) devices and systems.

2. Discussion of Related Art

The ability to interconnect computers and other intelligent devices, both internally and to the Internet, is a common requirement wherever people live and work today. The electrical connections required to form various local area network (LANs) have traditionally been accomplished by installing dedicated data wiring both inside buildings and between clusters of buildings. A number of wireless methods have also been developed and deployed to address this need.

Unfortunately, retrofitting existing buildings with special wiring can be expensive, and wireless systems are often inappropriate in high-density dwellings where excessive interference can be expected and the available bandwidth can be quickly overwhelmed. To address these problems, power line communications (PLC) technology, which allows existing electric power wiring to simultaneously transport power and high-speed data, has been realized. Unfortunately, PLC technology, while constantly improving, is often relatively expensive to implement. Accordingly, new PLC solutions for providing less expensive yet more efficient LANs and Internet connections are desirable.

SUMMARY

In accordance with an exemplary embodiment, a system for interfacing a power line communications (PLC)-enabled communication device with a multiple-phase power network residing in a building, wherein the multiple-phase power network includes a first power phase line, a second power phase line and a third power phase line, and wherein the multiple-phase power network also includes a first electric power meter monitoring a branch of the first power phase line and a first branch of the second power phase line and a second electric meter monitoring a second branch of the second power phase line and a branch of the third power phase line is disclosed. The system includes a first high-frequency transformer having a first primary side and a first secondary side and a second high-frequency transformer having a second primary side and a second secondary side, wherein the first primary side and the second primary side are electrically coupled to the communication device, and a first capacitor coupling the first secondary side to one of the first power phase line and the first branch of the second power phase line, and a second capacitor coupling the second secondary side to one of the third power phase line and the second branch of the second power phase line, such that the communications device can communicate with PLC-enabled terminals in contact with at least one of the power phase lines without allowing appreciable current leakage between the first and second electric meters.

In accordance with another exemplary embodiment, a system for interfacing a power line communications (PLC)-enabled communication device with a multiple-phase power network residing in a building, wherein the multiple-phase power network includes a first power phase line, a second power phase line and a third power phase line, and wherein the multiple-phase power network also includes a first electric power meter monitoring a branch of the first power phase line and a first branch of the second power phase line and a second electric meter monitoring a second branch of the second power phase line and a branch of the third power phase line is disclosed. The system includes a first high-frequency transformer having a first primary side and a first secondary side, and a second high-frequency transformer having a second primary side and a second secondary side, wherein the first primary side and the second primary side are electrically coupled to the communication device, and a plurality of capacitors with each capacitor electrically coupling either of the first secondary side or the second secondary side and a respective power phase line in a manner such that the PLC communications device can communicate with PLC-enabled terminals coupled to any of the first power phase line, the third power phase line, the first branch of the second power phase line and the second branch of the second power phase line without allowing appreciable current leakage between the first and second electric meters.

In accordance with yet another exemplary embodiment, a system for adapting a wye-configured three-phase power network residing in a building for power line communications (PLC)-enabled communication, wherein the three-phase power network includes a first power phase line, a second power phase line and a third power phase line, and wherein the three-phase power network also includes a first electric power meter monitoring a branch of the first power phase line and a first branch of the second power phase line and a second electric meter monitoring a second branch of the second power phase line and a branch of the third power phase line is disclosed. The system includes a PLC-enabled communication device, and a coupling means for coupling communications signals from the PLC-enabled communications device to PLC-enabled terminals coupled to each of the power phase lines without causing leakage between the first and second electric power meters.

DETAILED DESCRIPTION

Figure 1:
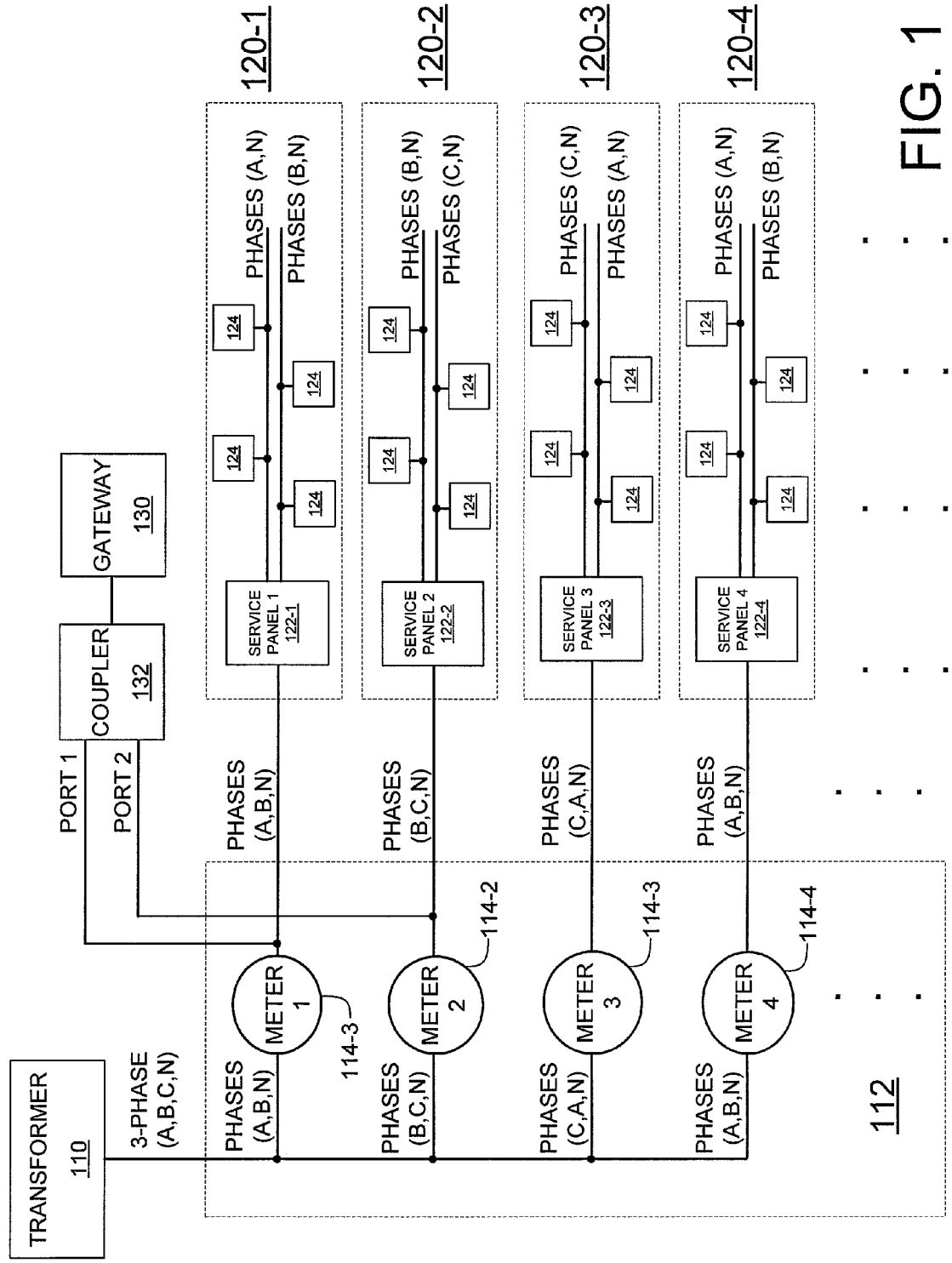
FIG. 1 is a block diagram of a power line communications system implemented for use with a set of buildings that uses low-voltage, three-phase power.

The disclosed methods and systems will now be described more fully hereinafter with reference to the accompanying drawings, in which preferred embodiments of the invention are shown. The disclosed methods and systems may, however, be embodied in many different forms and should not be construed as being limited to the embodiments set forth herein. Rather, these embodiments are provided so that this disclosure will convey the scope of the invention to those skilled in the art. In the drawings, like reference numbers refer to like elements throughout the specification.

FIG. 1 is a block diagram of a power line communications system implemented for use in a number of buildings using a low-voltage, three-phase power network. Note that while FIG. 1 depicts a series of building sections 120-1 . . . 120-4, in various embodiments the methods and systems may be applied to separate portions of a single building, to multiple buildings or even to multiple portions of multiple buildings.

As shown in FIG. 1, the three-phase power system includes a transformer 110 coupled to a terminal box 112 via power lines of a wye-configured power network that includes a first power phase line A, a second power phase line B, a third power phase line C and a neutral/ground line N. The power phase lines A, B and C are split at the terminal box 112 such that power phase lines A and B lead to a first electric power meter 114-1, power lines phase lines B and C leads to a second electric power meter 114-2, power lines phase lines A and C leads to a third electric power meter 114-3, power lines phase lines A and B leads to a fourth electric power meter 114-4, and so on.

Continuing, power phase lines A and B (along with neutral/ground N) can continue from the first electric meter 114-1 to a first main service panel 122-1; power phase lines B and C (along with neutral/ground N) can continue from the second electric meter 114-2 to a second main service panel 122-2; power phase lines A and C (along with neutral/ground N) can continue from the third electric meter 114-3 to a third main service panel 122-3; power phase lines A and B (along with neutral/ground N) can continue from the fourth electric meter 114-4 to a fourth main service panel 122-4, and so on. For the purposes of this disclosure, the side receiving electrical power of each power meter (the left side in FIG. 1) will be referred to as the "line side" of the meter, while the side supplying power (the right side in FIG. 1) to a respective building will be referred to as the "load side" of the meter.

From the various service panels 122-1 . . . 122-4, the various power phase lines A, B and C (along with neutral/ground N) may be distributed to various PLC-enabled terminals 124 residing within their respective dwellings/building/portions of one or more buildings 120 (collectively "buildings").

As is also depicted in FIG. 1, a gateway 130 connected to an Internet service provider (not shown) can be electrically coupled to a coupler 132 via a coaxial cable, wireless network or any other number of known or later-developed means. The coupler 132, in turn, can be electrically coupled to each of the power phase line pairs A/B and B/C (using PORT 1 and PORT 2) either at terminal box 112, at meters 114-1 and 114-2, at service panels 122-1 and 122-2 and/or along the electrical wiring between the meters 114-1 and 114-2 and service panels 122-1 and 122-2. Note that while coupler 132 is shown having two ports PORT1 and PORT 2 coupled to two of the buildings 120-1 and 120-2, in various embodiments it should be appreciated that the methods and systems of this disclosure may be applied to and number of buildings. However, for the present exemplary communications network is limited to two buildings 120-1 and 120-2 for simplicity of explanation.

In operation, the transformer 110, terminal box 112, electric meters 114-1 . . . 114-4 and service panels 122-1 . . . 122-4 can distribute electrical power throughout the buildings 120-1 . . . 120-4. As power is consumed by various devices (not shown) within the buildings 120-1 . . . 120-4, the electric meters 114-1 . . . 114-4 may separately monitor and record the power consumed by various respective devices attached to the various power phase lines A, B and C. For example, the first electric meter 114-1 may be used to monitor electricity consumed in building 120-1 via power phase lines A and B, while the second electric meter 114-2 may be used to monitor electricity consumed in building 120-2 via power phase lines B and C.

Simultaneously, the gateway 130 can provide a number of communication services for the various terminals 124. For example, in various embodiments the gateway 124 can act as a hub in a hub-and-spoke topology local area network (LAN), thus enabling terminals on the power phase lines A and B in building 120-1 to readily communicate with terminals on power phase line C of building 120-2. Further, the gateway 110 can provide Internet access for the various terminals and/or provide access to distant LANs, storage devices and so on.

For both regulatory and safety reasons, it should be appreciated that the coupler 132 should not interfere with the operation of the electric meters 114-1 and 114-2. More particularly, the coupler 132 should not allow for the appreciable transfer of electric current between the electric meters 114-1 and 114-2 in a way that might distort their power consumption measurement and/or provide a potential electrical hazard, ground-fault source and so on. To this end, the coupler 132 is specially designed as will be discussed below with respect to FIGS. 2 and 3.

Note that for the present example, the service panels 122-1 and 122-2 can be remote from one another, closely co-located or combined into a single panel. Also note that either of both of the service panels 122-1 and 122-2 can take the form of multiple sub-panels. Further note that while the exemplary buildings 120-1 . . . 120-4 are multi-dwelling residential units (MDUs), the methods and systems may be applied to apartment buildings, condominiums other MDUs, commercial buildings or any other structure that may use three-phase power and multiple electric meters to monitor power consumption.

While the exemplary powerline-based protocol is an OFDM-based LAN broadband protocol known as Homeplug® developed by Intellon Corporation of Ocala, Fla. (United States), the particular protocol can vary from embodiment to embodiment to use any known or later developed PLC-based communication standards, as well as any other capable communication standard developed for other media, such as HomePNA® which was developed for broadband communications over telephony/POTS twisted-wire pairs. Still further, in addition to LAN signals, the coupler 132 may pass on non-LAN signals, such as any number of DSL or other WAN signals.

Figure 2:
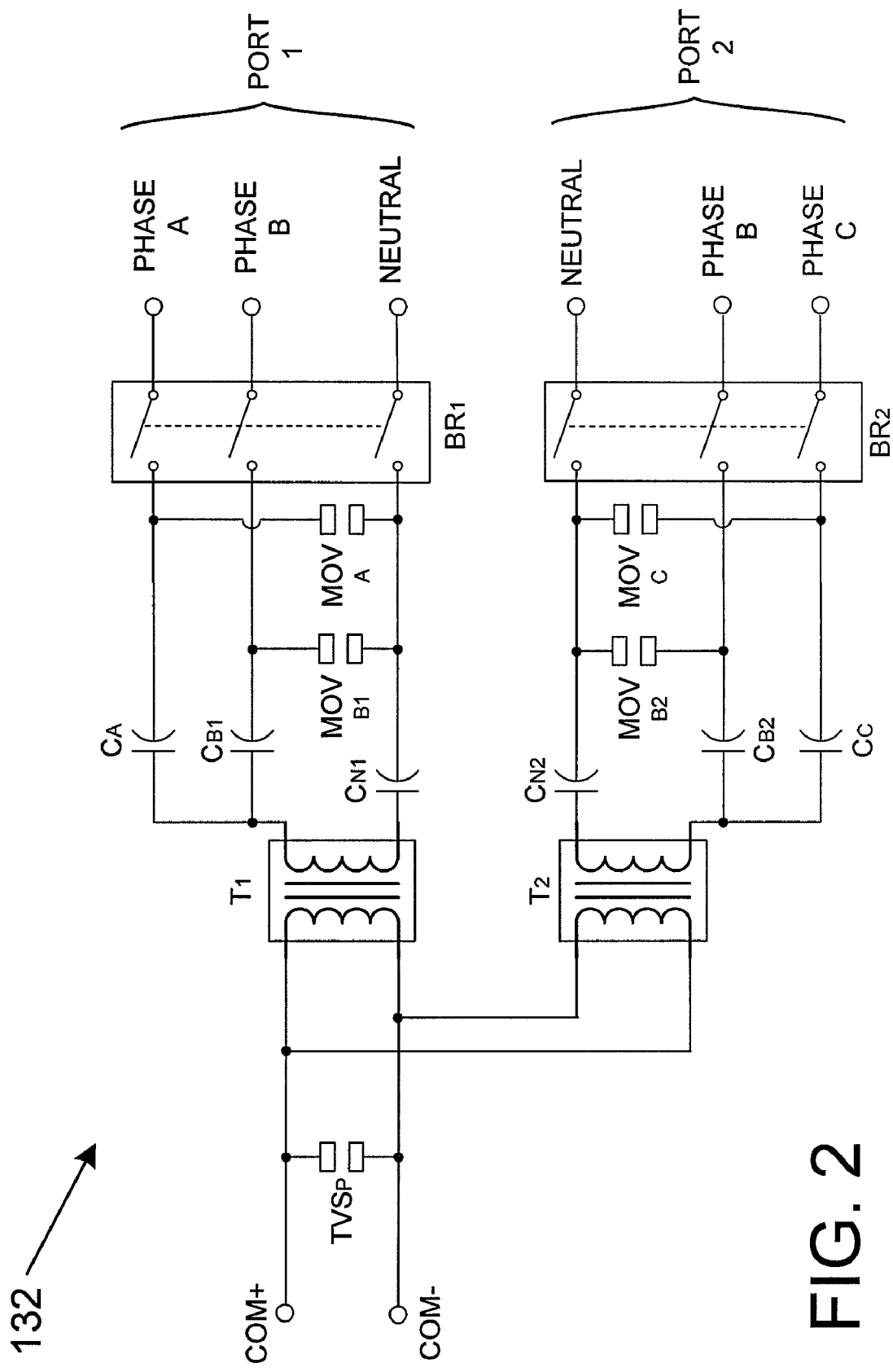
FIG. 2 is a schematic diagram of an exemplary embodiment of a coupler adapted for use with two electric power meters while avoiding power leakage between the electric power meters.

FIG. 2 is a schematic diagram of an exemplary embodiment of a coupler 132 adapted for use with two electric power meters while avoiding power leakage between the electric power meters. Starting from the left-hand side of FIG. 2, a pair of communications lines COM+ and COM− capable of carrying one or more broadband communication signals, such as the HomePlug® standard signal discussed above, can be coupled to the primary sides of a pair of high-frequency/broadband balun transformers $T_1$ and $T_2$ in a parallel fashion. An optional transient voltage suppressor $TVS_P$, may be placed between the communications lines COM+ and COM− to handle voltage spikes that may be cause by outside conditions, such as lightning strikes.

At the secondary side of transformer $T_1$, a first capacitor $C_A$ and a second capacitor $C_{B1}$ can be connected to the top terminal of the secondary side of transformer $T_1$ while a third (optional) capacitor $C_{N1}$ can be connected to the lower terminal of the secondary side of transformer $T_1$. The three capacitors $C_A$, $C_{B1}$ and $C_{N1}$ can be further connected to a first (optional) resettable breaker $BR_1$, which in turn can provide electrical continuity to the PORT 1 terminal (discussed with respect to FIG. 1) and to the first power phase line A, the second power phase line B and the electrical neutral/ground line N. Note that metal oxide varistors $MOV_A$ and $MOV_{B1}$ may be provided to protect against transient voltage spikes.

Similarly, at the secondary side of transformer $T_2$, a fourth capacitor Cc and a fifth capacitor $C_{B2}$ can be connected to the bottom terminal of the secondary side of transformer $T_2$ while a sixth (optional) capacitor $C_{N2}$ may be connected to the top terminal of the secondary side of transformer $T_2$. The three capacitors $C_C$, $C_{B2}$ and $C_{N2}$ can be further connected to a second (optional) resettable breaker $BR_2$, which in turn can provide electrical continuity to the PORT 2 terminal and to the second power phase line B, the third power phase line C and the electrical neutral/ground line N. Again note that metal oxide varistors $MOV_C$ and $MOV_{B2}$ may be provided to protect against transient voltage spikes.

Again it should be appreciated that the example of FIG. 2 may be expanded to more that two ports by adding additional sets of transformers, capacitors, varistors and breakers.

In operation, communication signals passing through the COM+ and COM− lines can be split into two portions to simultaneously pass through the transformer $T_1$ and $T_2$. The split communication signal from transformer $T_1$ can then propagate to PLC-enable terminals coupled to the first power phase line A and the second power phase line B via capacitors $C_A$ and $C_{B1}$. Similarly, the split communication signal from transformer $T_2$ can then propagate to PLC-enable terminals coupled to the second power phase line B and the third power phase line C via capacitors Cc and $C_{B2}$.

Similarly, communication signals originating on any of the power phase lines A, B and C can propagate (right to left) though their respective breakers, capacitors and transformers to the COM+ and COM− lines to be passed to a communications device, such as a gateway and/or a LAN hub.

Additionally, communication signals originating on any of the power phase lines A, B and C can propagate (right to left) though their respective breakers, capacitors and transformers and then back out (left to right) to other terminals coupled to of the power phase lines A, B and C. For example, a PLC-enabled terminal coupled to the first power phase line A can transmit a PLC communications signal that can propagate through the first breaker $BR_1$, capacitor $C_A$ and the first transformer $T_1$, then back out through the second transformer $T_2$, capacitor Cc and the second breaker $BR_2$ to be received at another PLC-enabled terminal coupled to the third power phase line C.

It should be appreciated that the use of separate transformers $T_1$ and $T_2$ can allow the coupler 132 to adapt a three-phase electrical network for communications use while maintaining the electrical separation necessary to isolate separate electrical meters. In various embodiments, transformers $T_1$ and $T_2$ may be high-frequency broadband transformers that do not allow for appreciable transfer of low-frequency (<100 Hz) energy.

Figure 3:
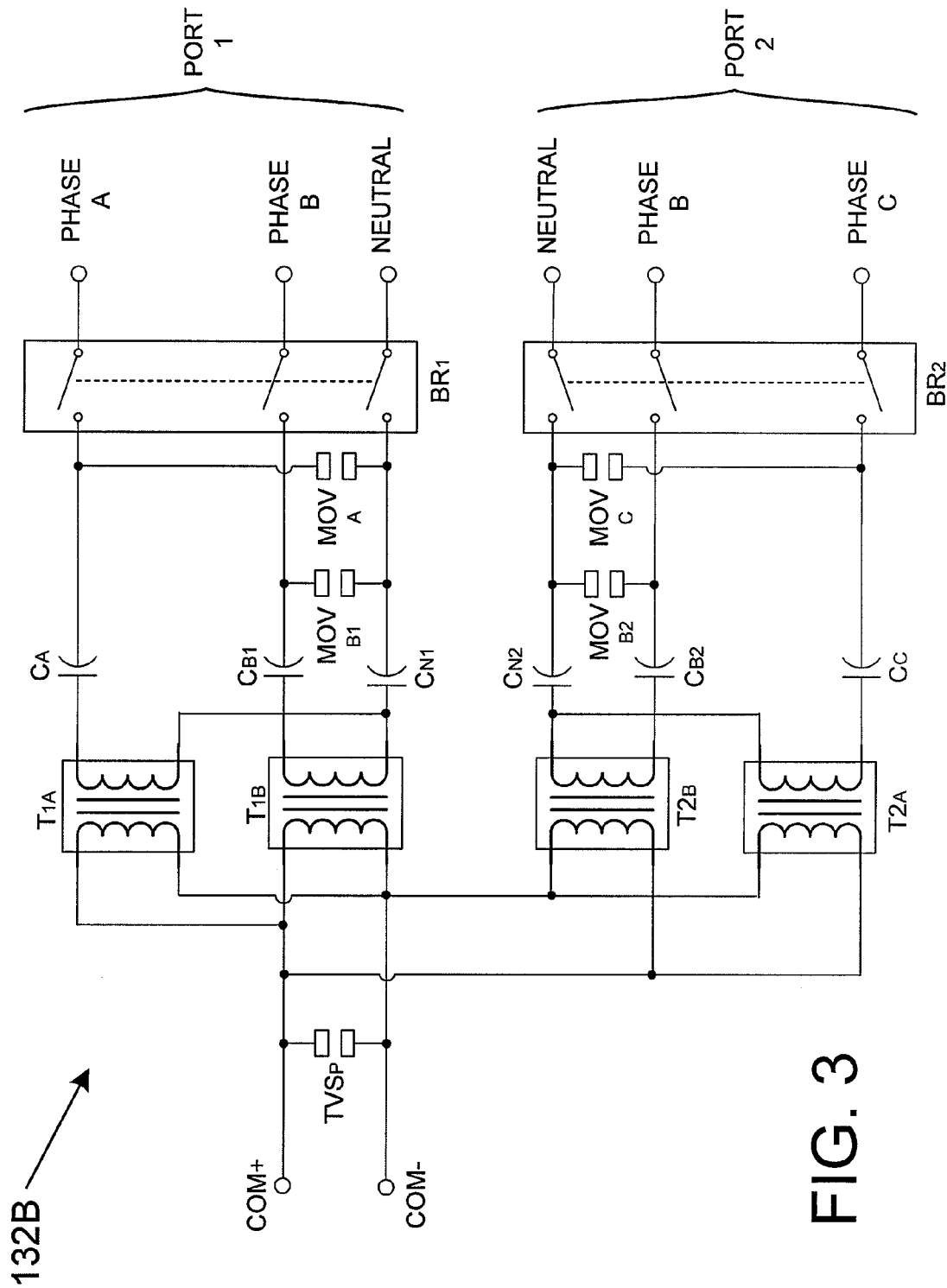
FIG. 3 is a schematic diagram of a second exemplary embodiment coupler adapted for use with two electric power meters while avoiding power leakage between the electric power meters.

Also note that while the embodiment of FIG. 2 uses two transformers $T_1$ and $T_2$, in other embodiments it can be possible to use multiple transformers for each port PORT 1 and PORT 2. For example, in another exemplary embodiment it can be possible to use a separate transformer for PHASE A and PHASE B on port 1 and/or use a separate transformer for PHASE B and PHASE C on port 2. FIG. 3 shows an exemplary adaptation of this concept where coupler 132B uses a first pair of transformers $T_{1A}$ and $T_{1B}$ to replace transformer $T_1$, as well as a second pair of transformers $T_{2A}$ and $T_{2B}$ to replace transformer $T_2$.

While the coupling devices depicted above are known as examples of capacitive coupling, it should be appreciated that the basic concepts can be extended to inductive coupling. Although inductive coupling devices are often far bulkier than capacitive devices, especially for power networks carrying a substantial amount of current, they may nonetheless be useful.

An example of an inductive coupling approach (analogous to the example of FIG. 3) can include two first transformers $T_{1A}$, $T_{1B}$ each having a first primary side and a first secondary side, as well as two second transformers $T_{2A}$, $T_{2B}$ each having a second primary side and a second secondary side.

The first primary sides and the second primary sides can be electrically coupled to a PLC communication device communication device. Series capacitors may optionally be added to each primary side to further abate cross coupling of power signals.

Each secondary side may be inductively coupled to a respective branch (thus eliminating the need for the secondary-side capacitors) noting that typically all the current of each power line will pass through a respective secondary side, which may require transformers of substantial size in order to prevent saturation of the transformer. Also note that in some embodiments the transformers can be toroids, and in some of those embodiments the toroid transformers may be "clamshell" devices for ease of installment In various embodiments where the above-described systems and/or methods are implemented using a programmable device, such as a computer-based system or programmable logic, it should be appreciated that the above-described systems and methods can be implemented using any of various known or later developed programming languages, such as "C", "C++", "FORTRAN", Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to communication services.

The many features and advantages of the disclosed methods and systems are apparent from the detailed specification, and thus, it is intended by the appended claims to cover all such features and advantages of the invention which fall within the true spirit and scope of the disclosed methods and systems. Further, since numerous modifications and variations will readily occur to those skilled in the art, it is not desired to limit the disclosed methods and systems to the exact construction and operation illustrated and described, and accordingly, all suitable modifications and equivalents may be resorted to, falling within the scope of the disclosed methods and systems. The scope of the claims, therefore, should be accorded the broadest interpretation so as to encompass all such modifications and similar arrangements.

What is claimed is:

1. A system for interfacing a power line communications (PLC)-enabled communication device with a power network residing in one or more buildings, wherein the power network includes a first electric power meter and a second electric meter, the system comprising:
coupling circuitry configured to receive a broadband communication signal from a PLC-enabled communications device, split the broadband communication signal into multiple portions, and inject a first portion of the broadband communication signal onto the load side of the first electric power meter and inject a second portion of the broadband communication signal onto the load side of the second electric power meter.

2. The system of claim 1, wherein the coupling circuitry includes:
a first high-frequency transformer having a first primary side and a first secondary side, wherein the first primary side is electrically coupled to the communication device;
a second high-frequency transformer having a second primary side and a second secondary side, wherein the second primary side is electrically coupled to the communication device;
a first capacitor coupling the first secondary side to one of the first power phase line at a load side of the first electric meter and the second power phase line at the load side of the first electric meter, and
a second capacitor coupling the second secondary side to one of the third power phase line at a load side of the second electric meter and the second power phase line at the load side of the second electric meter.

3. The system of claim 2, wherein the power network is a multi-phase power network that includes a first power phase line, a second power phase line and a third power phase line, and wherein the first electric power meter monitors the first power phase line and the second power phase line, and the second electric meter monitors the second power phase line and the third power phase line.

4. The system of claim 3, wherein the communications device can communicate with PLC-enabled terminals in contact with at least one of the power phase lines without allowing appreciable current leakage between the first and second electric meters.

5. The system of claim 2, wherein a first capacitor couples the first secondary side to the first power phase line, and the second capacitor couples the second secondary side to the third power phase line.

6. The system of claim 2, wherein a first capacitor couples the first secondary side to second power phase line, and the second capacitor couples the second secondary side to the second power phase line.

7. The system of claim 2, wherein a first capacitor couples the first secondary side to the first power phase line, and the second capacitor couples the second secondary side the second power phase line.

8. The system of claim 5, further comprising a third capacitor coupling the first secondary side to the second power phase line at the load side of the first electric meter such that the communications device can communicate with PLC-enabled terminals coupled to a first portion of the second power phase line.

9. The system of claim 8, further comprising a fourth capacitor coupling the second secondary side to the second power phase line at the load side of the second electric meter such that the communications device can communicate with PLC-enabled terminals in contact with a second portion of the second power phase line.

10. The system of claim 9, wherein the first and third capacitors are both connected to a first terminal of the first secondary side, and the second and the fourth capacitors care both connected to a first terminal of the second secondary side.

11. The system of claim 10, further comprising a fifth capacitor coupling a second terminal of the first secondary side to electrical ground, and a sixth capacitor coupling a second terminal of the second secondary side to electrical ground.

12. The system of claim 10, wherein a second terminal of at least one of the first secondary side and second secondary side is connected to electrical ground.

13. The system of claim 1, wherein the communications device is a gateway.

14. The system of claim 13, wherein the communications device is also adapted to act as a hub in a hub-and-spoke network topology.

15. The system of claim 2, wherein the first and second transformers are balun transformers.

16. A method for interfacing a power line communications (PLC)-enabled communication device with a power network residing in one or more buildings, wherein the power network includes a first electric power meter and a second electric meter, the method comprising:
receiving a broadband communication signal from a PLC-enabled communications device;
splitting the broadband communication signal into multiple portions;
simultaneously injecting a first portion of the broadband communication signal onto the load side of the first electric power meter and injecting a second portion of the broadband communication signal onto the load side of the second electric power meter.

17. A method of claim 16, wherein the power network is a multi-phase power network that includes a first power phase line, a second power phase line and a third power phase line, and wherein the first electric power meter monitors the first power phase line and the second power phase line, and the second electric meter monitors the second power phase line and the third power phase line.

18. The method of claim 17, wherein the communications device can communicate with PLC-enabled terminals in contact with at least one of the power phase lines without allowing appreciable current leakage between the first and second electric meters.

19. The method of claim 18, further comprising simultaneously injecting a third portion of the broadband communication signal onto the load side of the third electric power meter while injecting the second portion of the broadband communication signal onto the load side of the second electric power meter.

20. A system for interfacing a power line communications (PLC)-enabled communication device with a multiple-phase power network residing in one or more buildings, wherein the multiple-phase power network includes a first power phase line, a second power phase line and a third power phase line, and wherein the multiple-phase power network also includes a first electric power meter monitoring a branch of the first power phase line and the second power phase line, and a second electric meter monitoring the second power phase line and a branch of the third power phase line, the system comprising:
a PLC-enabled communication device; and
a coupling means for coupling communications signals from the PLC-enabled communications device to PLC-enabled terminals coupled to each of the power phase lines without causing appreciable leakage between the first and second electric power meters.

* * * * *